United States Patent
Cobb et al.

(10) Patent No.: US 6,456,435 B1
(45) Date of Patent: *Sep. 24, 2002

(54) METHOD AND APPARATUS FOR ADJUSTING SPOT SIZE OF ONE COLOR COMPONENT OF A MULTIPLE COLOR CO-AXIAL LASER BEAM

(75) Inventors: Joshua M. Cobb, Victor; Jennifer A. Lebaron, Rochester, both of NY (US)

(73) Assignee: Eastman Kodak Company, Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/493,982

(22) Filed: Jan. 28, 2000

(51) Int. Cl.[7] ............................................. G02B 27/00
(52) U.S. Cl. .................. 359/577; 359/578; 359/581; 359/891; 372/32; 372/102
(58) Field of Search ................ 359/577, 578, 359/580, 581, 584, 586, 589, 891, 894; 372/102, 32, 98

(56) References Cited

U.S. PATENT DOCUMENTS 3,821,794 A * 6/1974 Yoneyama .................. 359/891
5,697,006 A 12/1997 Taguchi et al.

* cited by examiner

*Primary Examiner*—Thong Nguyen
*Assistant Examiner*—Fayez Assaf
(74) *Attorney, Agent, or Firm*—Nelson Adrian Blish

(57) ABSTRACT

A method of adjusting a first spot size for a first color component (74) of a multiple color co-axial laser beam (70) that comprises, focusing the multiple color co-axial laser beam (70). Filtering the multiple color co-axial laser beam (70) with a filter (50) to adjust the first spot size. The filter (50) is opaque to the first color component (74) in an annular region (62) and transparent to the first color component (74) in a center region (60) of the multiple color co-axial laser beam (70). The filter (50) is transparent to a second color component (76) of the multiple color co-axial laser beam (70) in both the center region (60) and the annular region (62).

14 Claims, 7 Drawing Sheets

METHOD AND APPARATUS FOR ADJUSTING SPOT SIZE OF ONE COLOR COMPONENT OF A MULTIPLE COLOR CO-AXIAL LASER BEAM

FIELD OF THE INVENTION

The invention relates generally to focusing co-axial laser beams of different wavelengths, and in particular to varying of the size of a focused laser spot of one color while not affecting the size of a second, co-axial focused laser spot of a second color. More specifically, this invention relates to the adjustment of laser spot sizes in a three-color digital laser scanning printer for use in printing lenticular images.

BACKGROUND OF THE INVENTION

Lenticular overlays are a means of giving images the appearance of depth or motion. A lenticular image is created using a transparent upper layer having narrow, parallel lenticules, semi-cylindrical lenses, on an outer surface, and an image-containing media. The two layers form a lenticular system wherein different portions of an image are selectively visible as a function of the angle from which the system is viewed.

If the image is a composite picture made by bringing together a number of different parts of a scene photographed from different angles and the lenticules are oriented vertically, each eye of a viewer will see different elements and the viewer will interpret the net result as depth of field. The viewer may also move her head with respect to the image thereby observing other views with each eye and enhancing the sense of depth. When the lenticules are oriented horizontally, each eye receives the same image. In this case, the multiple images give illusion of motion when the composite image is rotated about a line parallel to a line formed by the viewers eyes.

One method of creating these images uses a lenticular sheet with a color photographic emulsion on the side opposite the lenticules. The stereoscopic images are exposed onto the lenticular material by a laser scanner and the material is processed to produce the lenticular image. See for example, U.S. Pat. No. 5,697,006 issued Dec. 9, 1997 to Taguchi et al.

The color image exposed on the lenticular material is produced by three lasers each, a different color, e.g. red, green, and blue. Typically, the red laser exposes a cyan layer of the emulsion, the green laser exposes a magenta layer, and the blue laser exposes a yellow layer. It is important that the width of each scanned line be the correct size. If exposure by one color produces a line which is wider than by exposure of another color, a colored "fringe" will be produced around each scan line. This will result in a colored shadow visible in the resultant lenticular image. This color fringing may be visible in non-lenticular, conventional laser printers, however, the magnifying effects of the lenticules make a lenticular printer more sensitive to line width error.

The widths of the lines are a function of the intensity distribution of the focused laser spot and of the emulsion characteristics. The emulsion characteristics are generally different for each color. Thus, an identical intensity distribution of separate laser wavelengths will not necessarily produce identical linewidths. It thus becomes important to have good control over the intensity distribution and thus, spot size produced by each laser beam.

Since the intensity distribution of a point focus is not constant or uniform, it is typical in the art to define a "spot size" as it relates to the intensity distribution. For example, when a gaussian laser beam is focused, the intensity distribution of the focused spot is a gaussian distribution with a spot size at the $1/e^2$ diameter equal to $$\frac{.635 \times \lambda}{NA},$$

where NA equals Numerical Aperture. When a uniform intensity distribution is focused, the result is an airy disc whose central diameter is $$\frac{1.22\lambda}{NA}.$$

So, by truncating an incident gaussian beam, it is possible to slightly change the intensity distribution of the focused slot and thus the spot size.

It is possible to control each laser's spot size separately if the laser beams are spatially separated. However, there are situations in which the laser beams are combined co-axially. It is not practical or convenient to separate the laser beams, once combined, in most applications. For example, the beams may be carried by separate fiber optic cables and then combined through a fiber multiplexer into a single fiber optic cable. The beams may also be combined co-axially by dichroic prisms.

The intensity distribution of the focused laser spot is a function of the laser wavelength, the aberrations of the optical system focusing the laser beam, and the intensity distribution of the laser inside the optical system. For a given optical system of fixed image quality, i.e., the aberrations are constant, it is possible to change the intensity distribution of a focused spot by changing either the wavelength of the light or by changing the intensity distribution of the laser somewhere in the optical system.

SUMMARY OF THE INVENTION

It is an object of this invention to provide a method and apparatus for changing the spot size of a focused laser spot of one color while not substantially changing the spot size of a co-axially focused laser spot of a second color. It is another object of the invention to provide a means for continuous adjustment of the spot size of a focused laser spot of one color while not substantially changing the spot size of a co-axially focused laser spot of a second color.

The present invention is directed to overcoming one or more of the problems set forth above. Briefly summarized, according to one aspect of the present invention, a method of adjusting a first spot size for a first color component of a multiple color co-axial laser beam comprises the steps of focusing the multiple color co-axial laser beam; filtering the multiple color co-axial laser beam with a filter to adjust the first spot size. The filter is opaque to the first color component in an annular region and transparent to the first color component in a center region of the multiple color co-axial laser beam. The filter is transparent to a second color component of the multiple color co-axial laser beam.

According to another aspect of the present invention, a lenticular image is formed on a lenticular sheet having a photographic emulsion coated on a side opposite the lenticules. A beam used to form the image is comprised of at least two intensity modulated beams of light of having different wavelengths, and focused spots from the beam are scanned on the lenticular material. The spots are scanned in a direction parallel to the long axes of the cylindrical lenses to form a latent lenticular image in the photographic emulsion.

A filter is placed in the path of the co-axial beams and is opaque in an annular region and transparent in the center region to a first laser wavelength and transparent to a second laser wavelength. The filter alters the incident intensity distribution to one set of laser wavelengths while not affecting the incident intensity distribution of another set of laser wavelengths. The result of this is a final focused laser spot size which is altered with respect to one wavelength.

In an alternate embodiment, the filter is placed in the path of the co-axial beams in an area where the beams are either converging or diverging, i.e., not in collimated light space. By translating the filter along a line parallel to the co-axial beam direction, the filter can be adjusted to apodize more or less of one set of laser wavelengths. This has the effect of continuously varying the focused intensity distribution over a predetermined range.

The invention provides an accurate method and apparatus for varying the intensity distribution, and thus the spot size, of a focused laser of one wavelength while not affecting the intensity distribution, and thus spot size, of a co-axially focused laser of a different wavelength.

The invention and its objects and advantages will become more apparent in the detailed description of the preferred embodiment presented below.

DETAILED DESCRIPTION OF THE INVENTION

Figure 1A:
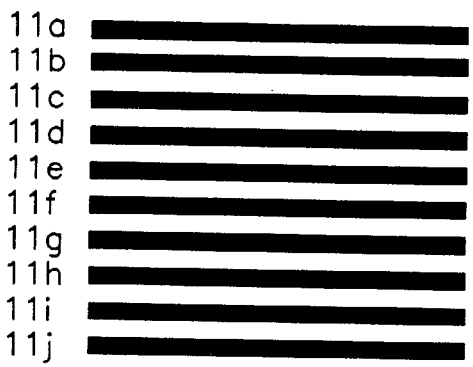
FIGS. 1A–1C are plan views segmented images used to form a lenticular image.
Figure 1B:
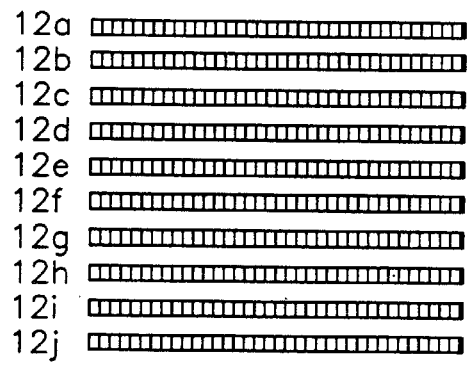
Figure 1C:
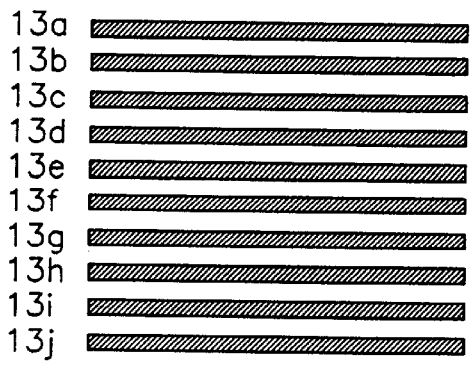

Referring to FIGS. 1A–1C, lenticular images are formed by digitally segmenting a plurality of images into slices. For example, image 10, is digitally segmented into slices 11a–11j. Image 20, is digitally segmented into slices 12a–12j. Image 30 is digitally segmented into slices 13a–13j.

Figure 2:
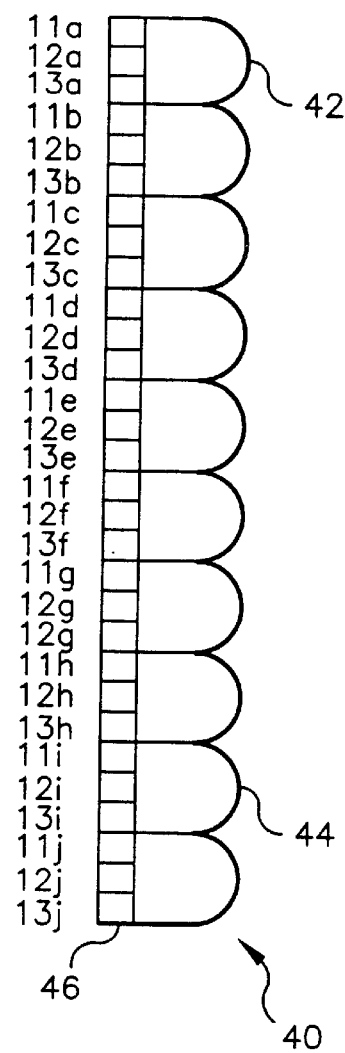
FIG. 2 is a sectional view of a composite lenticular image formed from the segmented images shown in FIGS. 1A–1C.

The slices 11a–12a, and 13a are interleaved and placed under the first lenticule 42 of the lenticular sheet 40, shown in FIG. 2. Continuing in this fashion, the rest of the interleaved images are placed under each lenticule until the final lenticule 44 contains the interleaved images 11j, 12j, and 13j. The lenticules angularly separate the images of each image slice so that when the lenticular sheet 40 is tilted, image 10, image 20, and image 30 are reconstructed at different tilt angles.

Figure 3:
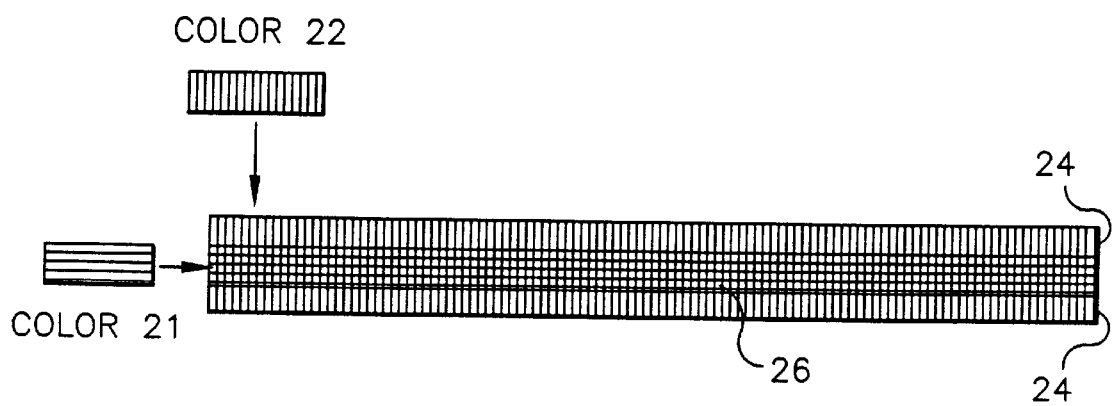
FIG. 3 is a plan view showing a single scan line composed of different colors with different widths.

The slices of each image can be exposed by scanning the focused spots of three different colored lasers, for example, red, green, and blue lasers, across the lenticular sheet 40 which has been coated with a photographic emulsion 46. If the focused spot size of one color is different from the focused spot size of another color, a colored fringe will be visible where the two colors do not overlap. This is illustrated in FIG. 3 wherein the laser spot responsible for writing color 22 is larger than the one responsible for writing color 21. The result is a colored fringe 24 around the slice 26 of the image which contains colors 21 and 22. In a lenticular image, this manifests itself as a colored "ghost" image. That is, referring back to FIG. 2, when viewing image 20 on the lenticular sheet 40, a faint colored shadow of image 10 might be visible. This is obviously objectionable to the viewer.

Figure 4:
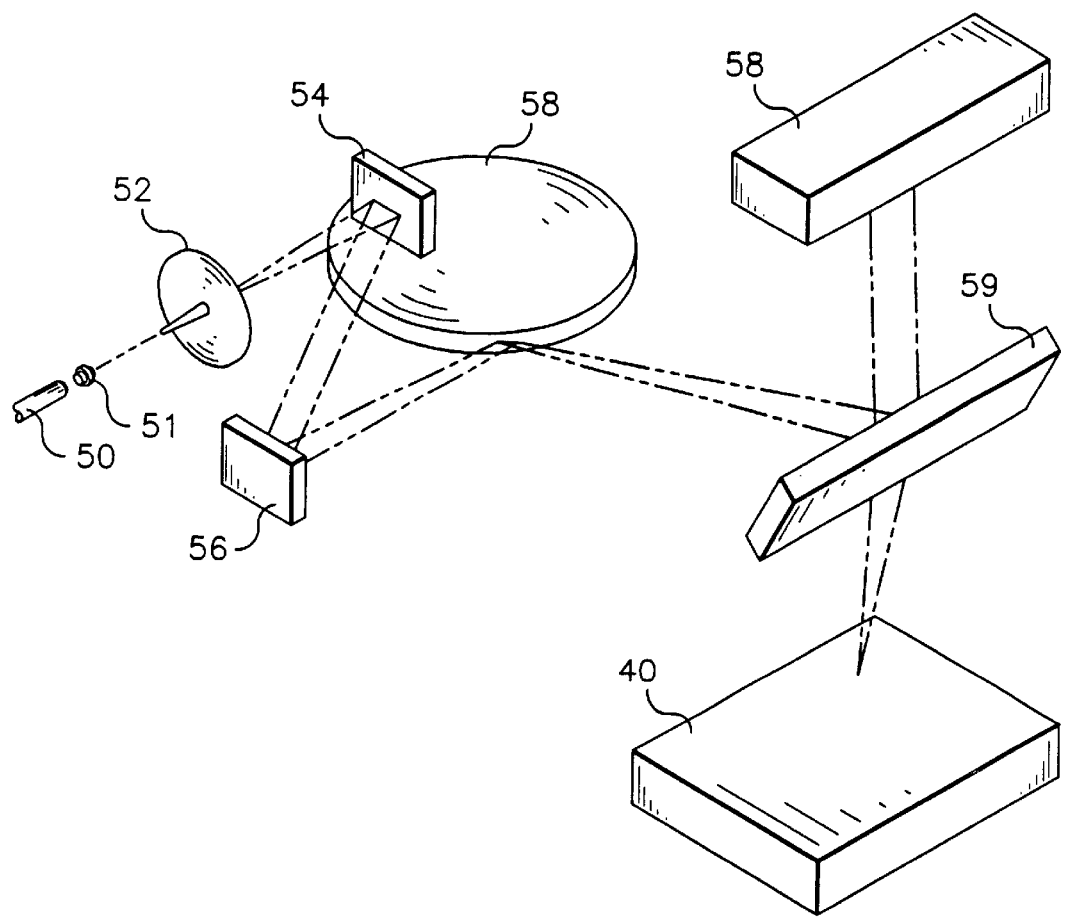
FIG. 4 is a schematic view of an optical system for scanning co-axial lasers used for exposing lenticular images on emulsion coated lenticular media.

FIG. 4 illustrates one method of writing the images onto the emulsion coated lenticular media. A fiber 50 carrying three individually modulatable laser beams is placed at the input side of a color corrected lens 51. This lens creates an image of the three laser beam waists. After the laser beams come to focus, they pass through an apodizing ring filter 52. The lasers are then shaped by two cylindrical beam shaping mirrors 54, 56, reflect off of a rotating scanning polygon 58, and are finally directed to the work plane by fold mirror 59 and a cylindrical mirror 58 such that the beam waists are imaged onto the lenticular sheet 40 at a predetermined magnification.

Figure 5:
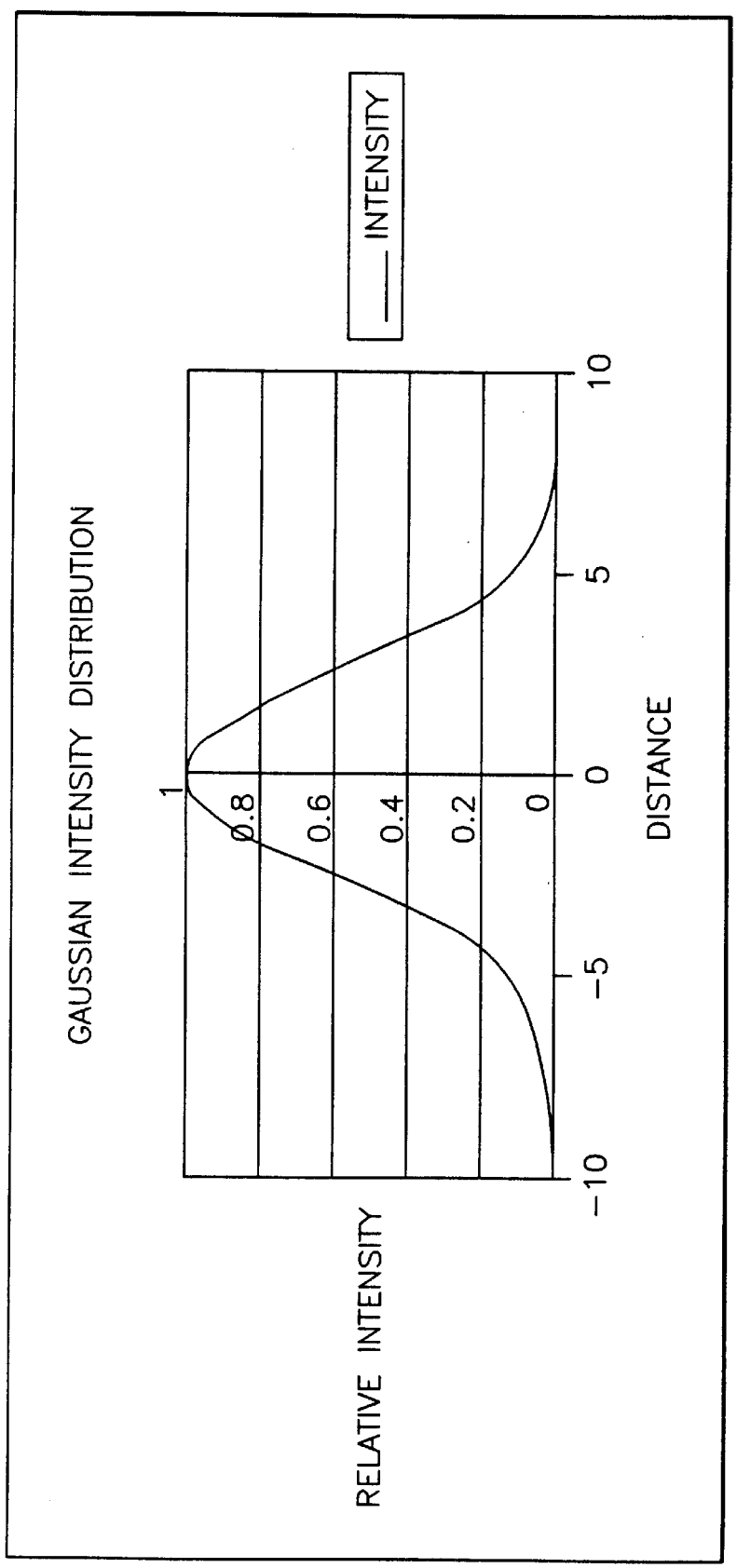
FIG. 5 is a graph of a typical intensity distribution across a single mode laser beam.

The intensity distribution of the focused beam waists generally takes the form of a gaussian as illustrated in FIG. 5. The width of the gaussian distribution is determined by diffraction which is, in turn, affected by wavelength. The width of the gaussian distribution at the work plane, or lenticular sheet, is specifically determined by several things including the width of the gaussian distribution at the fiber exit, the overall magnification of the entire optical scanning system, and the shape and size of any aperture in the system that of the mirrors and lenses are much larger than the $1/e^2$ beam diameter, and there are no aberrations that limit the spot size, then the size of the focused beam waist at the $1/e^2$ beam diameter will be approximately $(0.635*\lambda)/NA$, where $\lambda$ is the wavelength of light and NA is the Numerical Aperture as the light is brought to focus at the work plane. This spot size is the smallest that the laser can be focused to. Since the size of the spot is affected by wavelength, physics dictates that each color have a slightly different spot size. If the laser beam is obscured or apodized, the intensity distribution of the focused laser spot will change, and thus the size of the spot will grow.

Figure 6:
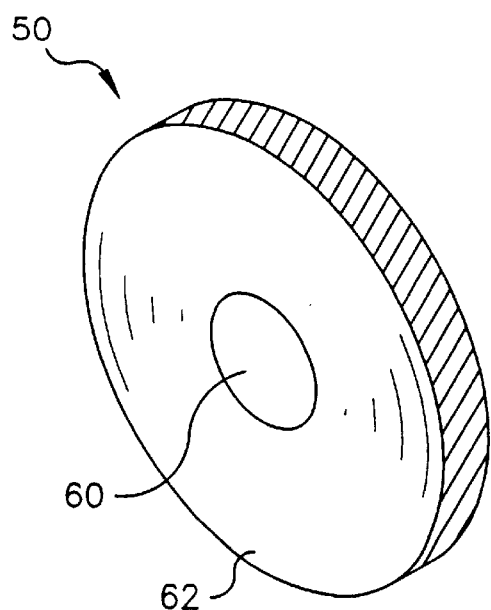
FIG. 6 is a perspective view of an annular filter which is a preferred embodiment of the invention.

This invention is to apodize one or more colors while not apodizing another color. Thus, a first color focused spot size can be changed without affecting a second color focused spot. FIG. 6 shows a filter 50 with a center region or window 60 of transparent material and an annular region 62 coated with a highly reflective for a first color. Filter 50 is highly transmissive for at least a second color in both the center region and the annular region.

Figure 7:
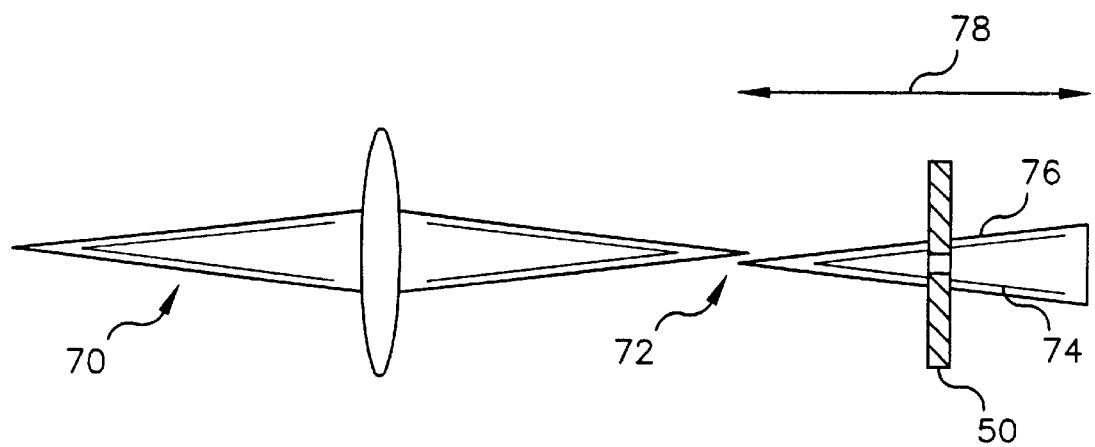
FIG. 7 is a plan view of the filter beam path.

FIG. 7 shows a preferred method of use for the invention. A co-axial laser beam 70 comprised of two or more laser beams is brought to a focus 72. A filter 50, in this embodiment a ring apodizer, is placed in the path of the divergent light. A second component 76 color passes straight through the plate without being obscured. A first color component 74 has gaussian profile effectively truncated by the highly reflective ring for using annular region 62. The apodizer can be translated laterally, in either direction, as the arrow 78 illustrates. By translating this filter, a different amount of truncation can be induced which will vary the size of the focused waist.

Figure 8:
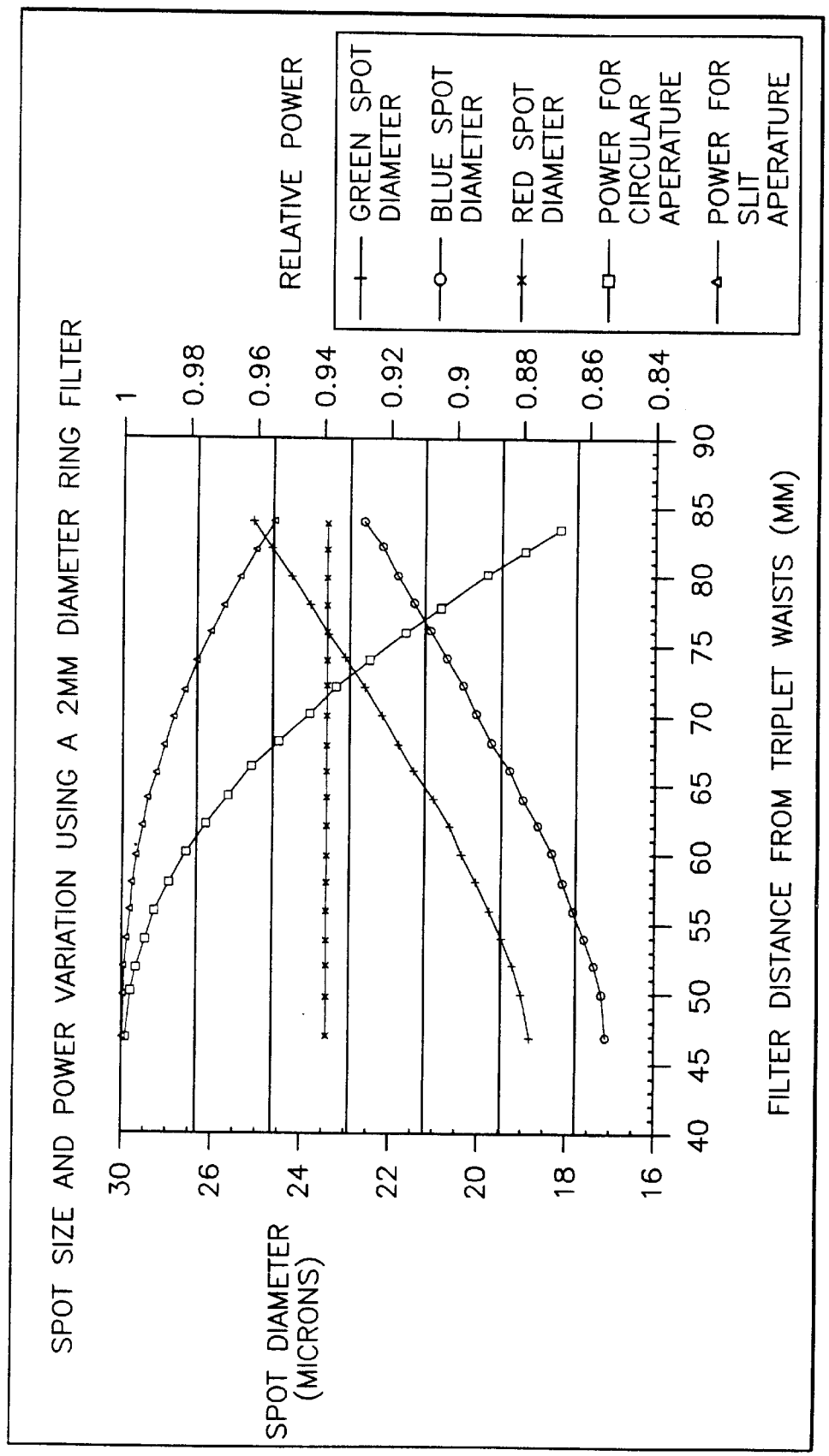
FIG. 8 is a graph showing laser spot size as a function of filter position and power loss as a function of filter position.
Figure 9:
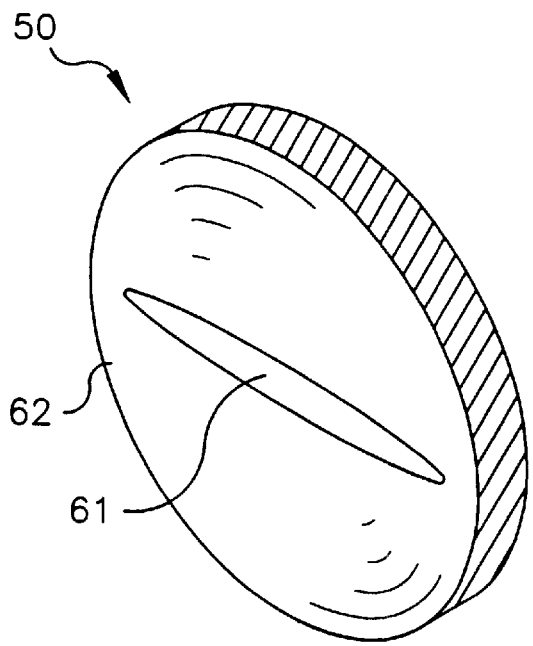
FIG. 9 is a perspective view of an annular filter with a central region slit.

Since the energy distribution across the aperture is a gaussian, the truncation of the gaussian tails does not impose a significant energy loss. FIG. 8 show a plot of the preferred embodiment's power change with spot size change. The filter had a 2 mm diameter inner aperture and was placed between 50 mm and 80 mm from the beam focus of an achromatic lens illustrated in FIG. 4. The apodizing ring filter was highly transparent to red light and highly reflective to blue and green light in the annular region. The co-axial beam comprised a red laser beam, a blue laser beam, and a green laser beam. By varying the distance between the apodizing filter and the focused beams the plot in FIG. 8 shows how the spot size in red is unaffected and the spot size in blue and green gets larger as more of the gaussian tails are blocked by the ring. Also, the right hand side of the plot illustrates the drop in power for green light. This plot also illustrates the drop in power when the ring is not created by a circular aperture, but a slit aperture 61, as shown in FIG. 9. In some circumstances, it might be desirable to vary the size of the spot in only one axis. In this case, only one axis needs to be apodized by the filter. In this case, the transmitting aperture of the filter could be a slit instead of a circle. The advantage to the slit is that less power is lost through the filter.

Figure 10:
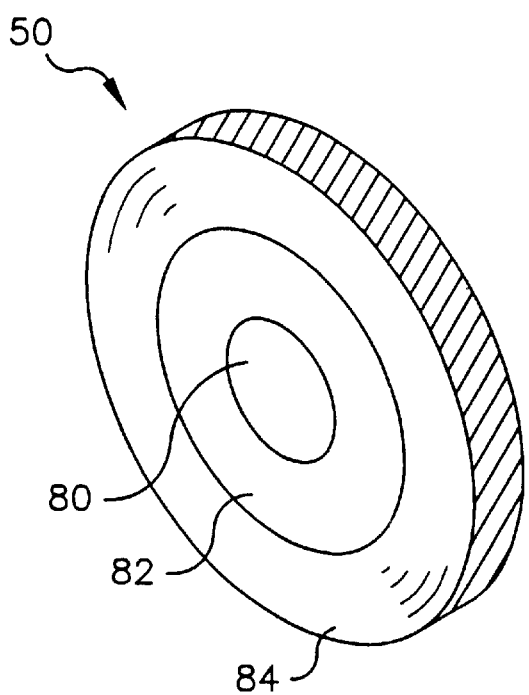
FIG. 10 is a perspective view of a filter with three annular regions.

FIG. 10 shows another embodiment of the present invention wherein filter 50 has three annular regions. A first region 80 is transparent to a first color, a second color, and a third color. A second region 82 is transparent to a first color and a second color but not the third color. A third region 84 is transparent to the first color but not the second color and the third color. This allows changing the spot size of color two with respect to color three and with respect to color one without changing the spot size of color one.

The invention has been described in detail with particular reference to certain preferred embodiments thereof, but it will be understood that variations and modifications can be effected within the scope of the invention. For example, the co-axial beam may be comprised of beams other than laser beams. Also, the invention may be used in any system that uses a co-axial beam comprised of different wavelengths of radiation. Also, rather than focusing the co-axial beam as a first step, the beam may be collimated.

PARTS LIST

10. Image
11a. Slice
11b. Slice
11c. Slice
11d. Slice
11e. Slice
11f. Slice
11g. Slice
11h. Slice
11i. Slice
11j. Slice
12a. Slice
12b. Slice
12c. Slice
12d. Slice
12e. Slice
12f. Slice
12g. Slice
12h. Slice
12i. Slice
12j. Slice
13a. Slice
13b. Slice
13c. Slice
13d. Slice
13e. Slice
13f. Slice
13g. Slice
13h. Slice
13i. Slice
13j. Slice
20. Image
21. Writing color
22. Writing color
24. Fringe
26. Slice
30. Image
40. Lenticular sheet
42. First lenticule
44. Final lenticule
46. Emulsion
50. Fiber
51. Color corrected lens
52. Filter
54. Beam shaping mirror
56. Beam shaping mirror
60. Window
62. Annular region
70. Co-axial laser beam
72. Focus
74. First color component
76. Second color component

What is claimed is:

1. A method of adjusting a spot size for a first color component of a multiple color co-axial laser beam comprising the steps of:
    focusing said multiple color co-axial laser beam to a waist image point;
    filtering said multiple color co-axial laser beam with a filter to adjust said first spot size;
    wherein said filter is opaque to said first color component in an annular region and transparent to said first color component in a center region of said multiple color co-axial laser beam;
    wherein said filter is transparent to a second color component of said multiple color co-axial laser beam in both said center region and said annular region;
    wherein said filter is at a location other than said waist image point; and
    focusing said filtered multiple color co-axial laser beams to create said spot.

2. A method as in claim 1 wherein said filter is opaque to a third color component of said multiple color co-axial laser beam in said annular region and transparent to said third color component in said center region.

3. A method as in claim 1 wherein said filter is located in a converging portion of said co-axial laser beam.

4. A method as in claim 1 wherein said filter is located in a diverging portion of said co-axial laser beam.

5. A method as in claim 1 wherein said filter is moved in a direction parallel to said co-axial laser beam to vary said first spot size of said first color component.

6. A method as in claim 1 wherein said first color component and said second color component of said multiple color co-axial laser beam are individually modulated.

7. An apparatus for adjusting a spot size of a first color component of a multiple color co-axial laser beam comprising:

lasers for forming said multiple color co-axial laser beam;

a filter having an annular region which is opaque to said first color component and a center region which is transparent to said first color component, and transparent to a second color component of said multiple color co-axial laser beam;

wherein said filter is located in a converging portion of said co-axial laser beam; and at least one optical element which creates an image of a laser beam waist for said first color component to form said spot.

8. An apparatus as in claim 7 wherein said center region is transparent to a third color component of said multiple color co-axial laser beam and said annular region is opaque to said third color component.

9. An apparatus as in claim 7 wherein said filter is moved in a direction parallel to said co-axial laser beam to vary said spot size of said first color component.

10. A method of adjusting a spot size for a first color component of a multiple color co-axial laser beam comprising the steps of:

collimating said multiple color co-axial laser beam;

filtering said multiple color co-axial laser beam with a filter to adjust said spot size;

wherein said filter is opaque to said first color component in an annular region and transparent to said first color component in a center region of said multiple color co-axial laser beam;

wherein said filter is transparent to a second color component of said multiple color co-axial laser beam in both said center region and said annular region;

wherein said filter is at a location other than said waist image point; and focusing said filtered multiple color co-axial laser beams to create said spot.

11. A method as in claim 10 wherein filter is in a converging portion of said co-axial laser beam.

12. A method as in claim 10 wherein said filter is in a diverging portion of said co-axial laser beam.

13. A method as in claim 10 wherein said first color and said second color of said co-axial laser beam are individually modulated.

14. An apparatus for adjusting a first spot size of a first color component of a multiple color co-axial laser beam comprising:

lasers for forming said multiple color co-axial laser beam;

a filter having an annular region which is opaque to said first color component and a center region which is transparent to said first color component, and transparent to a second color component of said multiple color co-axial laser beam; and wherein said filter is located in a diverging portion of said co-axial laser beam.

* * * * *